INVENTORS
C. J. KIRK &
C. D. P. SMALLPEICE

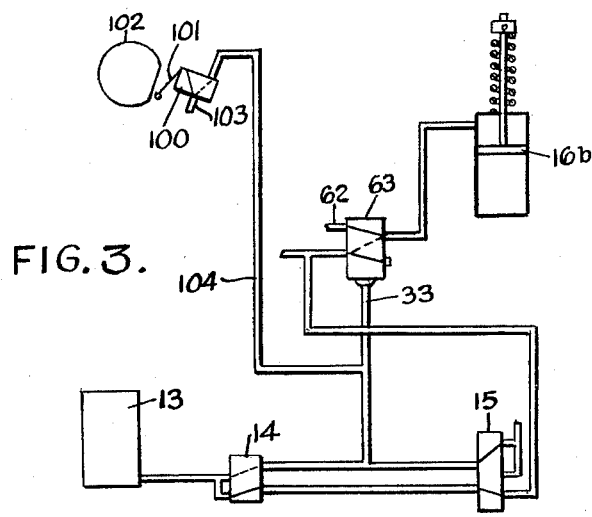
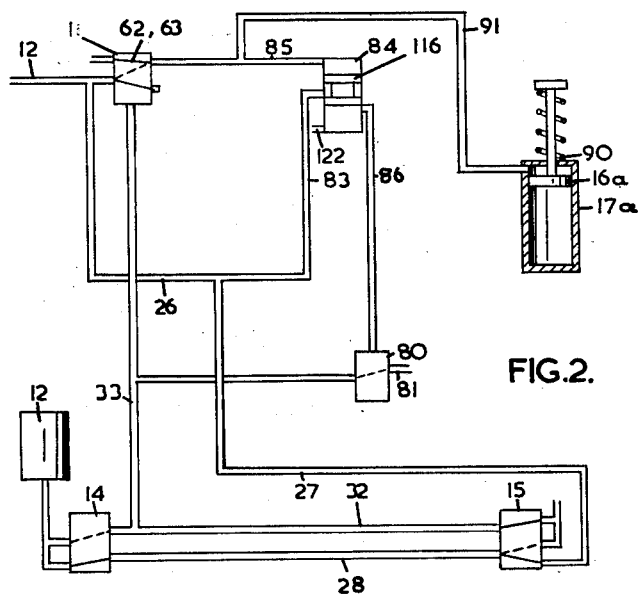

Patented May 11, 1954

2,678,027

UNITED STATES PATENT OFFICE 2,678,027

TWO-HAND CONTROL FOR THE SUPPLY OF PNEUMATIC PRESSURE TO PRESSURE-RESPONSIVE DEVICES

Colin John Kirk and Cosby Donald Philipps Smallpeice, Richmond, England, assignors to Smallpeice Limited, Richmond, England Application October 31, 1952, Serial No. 318,128

Claims priority, application Great Britain October 31, 1951

3 Claims. (Cl. 121—38)

The invention relates to a two-hand control for the supply of pneumatic pressure to a pressure-responsive device such, for instance, as a pneumatic piston and cylinder arrangement or a pneumatic pressure-operated main valve in a pneumatic pressure supply line.

The object of the invention is a control of this kind which requires a deliberate act of an operator and is less subject to accidental operation than controls at present in use.

According to the invention the control includes a reservoir which is connected to a supply of compressed gas when the movable members of two control valves, connected in series between the reservoir and the supply, are in one position, and which discharges to the pressure-responsive device through a path which is only established when both movable members are operated substantially simultaneously to an alternative position, the movement to the alternative position of one only of the two movable valve members connecting the reservoir to exhaust. Preferably the movable members of both control valves are biassed to the position in which the reservoir is fed from the supply and are independently manually operable (for example, by push-button type controls) for establishing the said path.

In the drawings:

Figure 2 is a similar diagram, but showing the control applied to a single-acting piston and cylinder arrangement of which the piston is spring-biassed to a rearward position; and Figure 3 illustrates a modified way of allowing the servo-operated valve of Figure 2 to return under its bias.

Figure 1:
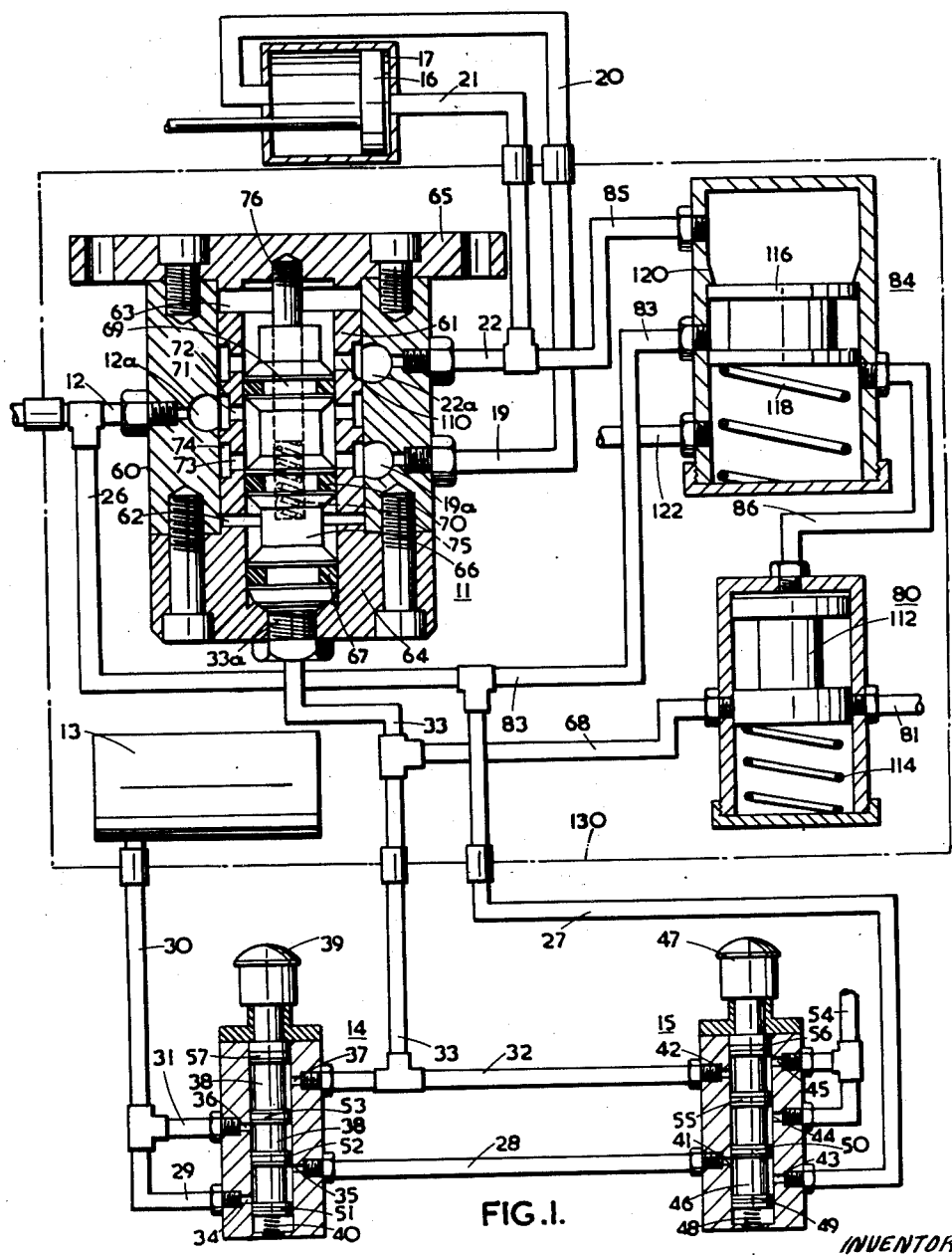
Figure 1 is a diagram illustrating the application of a control, according to the invention, to actuate a servo-operated valve connected in the supply to a double-acting, pneumatic piston and cylinder arrangement, and it also shows a means for automatically returning the piston at the end of a forward stroke.

Referring to Figure 1, the servo-operated valve is indicated at 11, the pneumatic supply line at 12, the reservoir at 13, the two control valves at 14 and 15, and a double-acting piston and cylinder arrangement, to be controlled, at 16, 17. The valve 11 is shown biassed to the position in which it had previously supplied air through pipes 19 and 20 for returning the piston 17 after a forward stroke; the piston, in assuming the fully returned position shown, having expressed the air in front of it through the pipes 21 and 22 and an exhaust passage of the valve.

The control valves 14 and 15 (which are of a push-button type) are shown in the positions in which they are set by their biasses, with internal passages permitting pressure air from the supply 12 to charge the reservoir 13 through pipes 26, 27, 28, 29 and 30. When both control valves are operated simultaneously (or substantially so) against their biasses they connect the reservoir through pipes 30, 31, 32 and 33 to actuate the servo-operated valve 11, against its bias, for connecting the supply 12 to the rear of the cylinder 16, through pipes 22 and 21, for giving the piston a forward stroke during which it expels the air in front of it through the pipes 20 and 19 and through an exhaust passage of the valve 11.

The construction and functioning of the control valves 14, 15 will now be described. It will be seen that the valve 14, which is shown in the position for charging the reservoir, has two pairs of ports 34, 35 and 36, 37 with which coact a movable valve member 38 which can be slid by a push-button 39 against a biassing spring 40. The valve 15 has two ports 41, 42 on one side, and three ports 43, 44 and 45 on the opposite side of a movable member 46 which also can be slid by a push-button 47 against a biassing spring 48.

In the position shown the ports 41 and 43 of the valve 15 are in communication through an annular space between lands 49 and 50 of the valve member 46, and the ports 34 and 35 of the valve 14 are in communication through a similar annular space between lands 51 and 52 of the valve member 38. In these conditions the pressure air in pipe 27 is fed through pipes 28, 29 and 30 to charge the reservoir. It will be noted that a further land 53 on valve member 38 is interrupting a communication between ports 36 and 37 of valve 14, and that ports 42 and 45 of valve 15 communicate with an exhaust pipe 54 through an annular space between lands 55 and 56 on the valve member 46. Thus the pipe 33 is in communication with the exhaust pipe for permitting the servo-operated valve 11 (presently to be described) to recover the position into which it is biassed.

If both push-buttons 39 and 47 are operated simultaneously, the land 52 of valve 14 is moved to interrupt the communication between ports 34 and 35, and the ports 36 and 37 are put into communication through an annular space between the land 53 and a further land 57 of the valve member 38; and as regards valve 15 the communication between ports 41 and 43 will be interrupted by the land 50, and the communication between ports 42 and 45 will be interrupted by the land 56. In these conditions the compressed air in the reservoir can leave through pipes 31, 32 and 33 to actuate the servo-operated valve 11 against the bias for connecting the supply line to effect the forward stroke of the piston 17, and the end of the pipe 28 adjacent the valve 15 is put into communication with the exhaust pipe 54 through ports 41 and 44 and an annular space between lands 50 and 55.

Should push-button 39 only be operated the pipe 32 will still be in communication with the exhaust pipe 54 and the compressed air will not be delivered through pipe 33 for actuating the servo-operated valve 11; also the movement of land 52 of valve 14 will cut off the supply from the pipes 27 and 28 to the reservoir.

On the other hand should push-button 47 only be operated, the compressed air in the reservoir would pass through the pipe 28 to the exhaust pipe 54 through the annular space between lands 50 and 55, and the pressure in the pipe 27 would be held between lands 49 and 50.

The servo-operated valve 11 is shown as comprising a body 60 which is externally rectangular and contains a cylindrical, ported liner 61, there being lateral exhaust passages 62 and 63 between the ends of the liner and a cover 64 and a base 65, respectively. The body 60, has, on one side of the liner, a bore 12a communicating with the supply line 12, and on the other side it has bores 22a and 19a respectively communicating with the pipes 22 and 19 for supplying the piston and cylinder arrangement. The movable member 66 of the valve has a piston-like portion 67 working in a bore of the cover 64 and the latter has a port 32a communicating with pipe 33. In the position shown a land 69 of the valve member is interrupting a communication between bores 12a and 22a, and a land 70 is establishing a communication between bores 12a and 19a, the communication being through ports 71 in an external annular groove 72 of the liner which is fed from the bore 12a, and ports 73 in a similar groove 74 of the liner and communicating with the bore 19a. In this position the valve 11 is supplying the compressed air through pipes 19 and 20 for effecting the return stroke of the piston 17, the pipe 21 leading to the other end of the cylinder being connected, through the bore 22a and ports 110 in another annular groove of the liner, to the exhaust passage 63.

When both push-buttons 39 and 47 are operated the resultant pressure in pipe 33 displaces the valve member 66 of valve 11 against a biassing spring 75, the latter being in a bore of the valve member 66 and reacting on a pin 76 which is fast with the base 65 and guides the valve member 66. In the new position, the bores 12a and 22a are put into communication through the annular space between lands 69 and 70 for effecting the forward stroke of the piston 17, and the bore 19a is connected to the exhaust space 62.

When the piston 17 reaches the end of its forward stroke and the supply pressure consequently builds up behind it in the pipe 85, it can be arranged for a pressure-operated valve 80 to be operated for putting pipe 33 into communication, through a branch pipe 68, with an exhaust outlet 81, whereby to initiate the return stroke of the piston. For this purpose the supply pressure can be fed, from the pipe 26 and a pipe 83, to a valve 84 containing a pressure responsive element which controls a communication to a pipe 86 leading to the valve 80. It is arranged for the pressure responsive element of the valve 84 to be acted on, through the pipe 85, by the built-up pressure to operate the valve 80 by air delivered through the pipe 86.

The valves 80 and 84 can be of any suitable known kind, but functional examples are shown in the drawings, the means by which the settings of the valves could be adjusted not being shown. The valve 80 is shown as having a plunger 112 which is to be depressed against a spring 114 by the preponderant pressure acting through the pipe 86 for establishing a communication between the branch pipe 68 and the exhaust outlet 81, the valve 84 having a plunger 116 which is held against an abutment 120 by a spring 118 in a position in which the pipe 86 communicates with an exhaust outlet 122. The plunger is depressed by a predetermined preponderance of the pressure in pipe 85 over the spring pressure to place the pipes 83 and 86 in communication for operating valve 80.

Figure 2 shows an adaptation of the dual push-button control, described above, to the operation of a single-acting piston and cylinder arrangement 16a, 17a, the piston being biassed to the returned position by a spring 90. In this application the servo-operated valve 11 is urged by its bias to cut off the supply through a pipe 91 to the cylinder, and to put the said pipe in communication with an exhaust opening like 62 or 63 of the valve. Valves 80, 82 and 84 are provided for initiating the return stroke of the piston when the pressure at the end of the forward stroke builds up.

Another application of the control to a single-acting piston and cylinder arrangement is shown in Figure 3, but instead of the return stroke being initiated by valves 80, 82 and 84, there is a valve 100 which has an arm 101 operated by a cam 102, driven from a part moving with the piston 16b, for putting pipe 33 into communication with an exhaust port 103 through a pipe 104.

Conveniently, and as shown in Figure 1, the various valves can be arranged in a box of which the outline is indicated at 130.

The control arrangement of the invention can be applied as a safety measure, for the operation of the clutch of a mechanical press or for delivering compressed air to operate a pneumatic press, the provision of separate push-button controls for operating the two control valves ensuring that the press shall only be operated after a deliberate two-fold simultaneous (or substantially simultaneous) action by an operator. Obviously, however, the control of the invention can be applied to other uses, not necessarily as a safety measure, and the valves 14 and 15 could be arranged for mechanical actuation (e. g., by cams) instead of manually.

What we claim as our invention and desire to secure by Letters Patent of the United States is:

1. A two-hand control for a supply of pneumatic pressure to a pressure-responsive device, including a reservoir, two control valves each having a manually-movable member, said movable members operable to alternative positions in which different through-passages are established through the associated valves, respective said through-passages of said valves which are selected when the movable member of each control valve is in a predetermined position for connecting the reservoir to the supply of pneumatic pressure through the two control valves connected in series, means forming a connection from between the two control valves to the pressure-responsive device, a communication containing one of said control valves and extending from said reservoir to said connection, said connection being cut-off from said reservoir and open to exhaust when said movable members are in said predetermined positions, and other respective said through-passages of said valves which are selected when the movable members of said control valves are in opposite predetermined positions to establish a communication from said reservoir to said pressure-responsive device through said connection, such that said connection to said pressure-responsive device will be established only when both said movable members are operated substantially simultaneously to said opposite predetermined positions, and so that movement of only one of said movable members to its said opposite position will connect the reservoir to exhaust.

2. A control for a supply of pneumatic pressure to a pressure-responsive device, including a reservoir, two control valves each having a movable member which is biassed to a predetermined position and is manually operable to an alternative position, each of the movable members controlling two independent passages through the associated control valve, means connecting the supply of pneumatic pressure to one of the passages of one of the control valves, which passage is open when the movable member of said one control valve is in said predetermined position, a pipe line connecting said one passage of said one control valve to one of the passages of the other control valve, which latter passage is open when the movable member of said other control valve is in said predetermined position, means connecting said open passage of said other control valve to said reservoir, a second pipe line interconnecting the second passages of said control valves, the second passage of said one control valve being open and connected to exhaust when the movable member of said one control valve is in said predetermined position, the second passage of said other control valve connecting said second pipe line to the reservoir but being closed when the movable member of said other control valve is in said predetermined position, and means connecting said second pipe line to the pressure-responsive device, the control valves being such that, when the movable members of both are operated to their alternative positions, the said one passage of said one control valve will be closed and the adjacent end of said first-mentioned pipe line will be opened to exhaust, the second passage of said one valve will be closed, said one passage of said other control valve will be closed, and the second passage of said other control valve will be opened.

3. A control, according to claim 2, and including a pneumatic pressure-consuming means, the pressure-responsive device being a servo valve having connections whereby, when it is energized from the reservoir, it will directly connect the supply of pneumatic pressure to the pressure-consuming means.

References Cited in the file of this patent

UNITED STATES PATENTS

| Number | Name | Date |
|---|---|---|
| 1,996,231 | Daly | Apr. 2, 1935 |
| 2,346,829 | Davis | Apr. 18, 1944 |
| 2,618,931 | Cantley | Nov. 25, 1952 |